(12) United States Patent
Maureira Carsalade et al.

(10) Patent No.: US 12,123,471 B2
(45) Date of Patent: Oct. 22, 2024

(54) SELF-CENTERING IMPACT ENERGY DISSIPATION MECHANISM

(71) Applicant: UNIVERSIDAD CATOLICA DE LA SANTISIMA CONCEPCION, Concepcion (CL)

(72) Inventors: Nelson Eduardo Maureira Carsalade, Concepcion (CL); Mauricio Felipe Villagran Valenzuela, Concepcion (CL)

(73) Assignee: UNIVERSIDAD CATOLICA DE LA SANTISIMA CONCEPCION, Concepcion (CL)

( * ) Notice: Subject to any disclaimer, the term of this patent is extended or adjusted under 35 U.S.C. 154(b) by 0 days.

(21) Appl. No.: 17/754,687

(22) PCT Filed: Oct. 8, 2019

(86) PCT No.: PCT/IB2019/058571
§ 371 (c)(1),
(2) Date: Apr. 8, 2022

(87) PCT Pub. No.: WO2021/069954
PCT Pub. Date: Apr. 15, 2021

(65) Prior Publication Data
US 2024/0093755 A1    Mar. 21, 2024

(51) Int. Cl.
| | |
|---|---|
| F16F 13/00 | (2006.01) |
| E04H 9/02 | (2006.01) |
| F16F 15/14 | (2006.01) |
| B61K 7/16 | (2006.01) |
| B63B 59/02 | (2006.01) |
| E01F 15/14 | (2006.01) |
| E02B 3/26 | (2006.01) |

(52) U.S. Cl.
CPC .............. *F16F 13/005* (2013.01); *B61K 7/16* (2013.01); *B63B 59/02* (2013.01); *E01F 15/146* (2013.01);
(Continued)

(58) Field of Classification Search
CPC .......... B60G 13/04; B61K 7/16; B63B 59/02; E01F 15/146; E02B 3/26; E04H 9/021;
(Continued)

(56) References Cited

U.S. PATENT DOCUMENTS 2,842,939 A * 7/1958 D Auriac .................. E02B 3/26
114/220
3,585,958 A * 6/1971 Naczkowski ........... B63B 59/02
114/220
(Continued)

FOREIGN PATENT DOCUMENTS

CN       103303230 A      9/2013
CN       114045953 B  *  7/2022  ........... E04H 9/0237
(Continued)

OTHER PUBLICATIONS

International Search Report for Corresponding International Application No. PCT/IB2019/058571, 2 pages, Jun. 3, 2020.

*Primary Examiner* — Thomas W Irvin
(74) *Attorney, Agent, or Firm* — Lucas & Mercanti, LLP

(57) ABSTRACT

A mechanism for mounting in ground, foundation or structure, to provide road, port, railway or similar passive safety for protection of the respective vehicles or structures, having at least one rigid element arranged as a side of a triangle whose basal side rests on the ground, with its first end at the apex of the triangle, its midpoint pivoted to an intermediate element, and with its second end pivoted with respect to at least one friction element; a friction dissipation member; at least one elastic element arranged with its axis in the direction of the degree of freedom; the at least one friction element and at least one rigid element are attached by a coupling element allowing sliding of each friction element perpendicular to the impact load when it compresses the elastic element.

13 Claims, 8 Drawing Sheets

(52) U.S. Cl.
CPC ............... *E02B 3/26* (2013.01); *E04H 9/021* (2013.01); *F16F 2222/04* (2013.01); *F16F 2230/0023* (2013.01); *F16F 2230/04* (2013.01)

(58) Field of Classification Search
CPC ........ F16F 7/08; F16F 13/005; F16F 2222/04; F16F 2230/0023; F16F 2230/04
See application file for complete search history.

(56) References Cited

U.S. PATENT DOCUMENTS

| | | | |
|---|---|---|---|
| 4,137,861 A | | 2/1979 | Brummenaes |
| 4,883,388 A | * | 11/1989 | Cherbonnier .......... B63G 11/00 405/195.1 |
| 5,644,879 A | * | 7/1997 | Shreiner ................. E04H 9/021 52/573.1 |
| 6,226,935 B1 | * | 5/2001 | Kuramochi ........... E04H 9/0237 52/167.3 |
| 6,279,693 B1 | | 8/2001 | Wiebe |
| 8,408,153 B2 | | 4/2013 | Montgomery |
| 10,359,093 B2 | * | 7/2019 | Amaudric Du Chaffaut ............... B60G 17/00 |

FOREIGN PATENT DOCUMENTS

| | | |
|---|---|---|
| FR | 1031969 A | 6/1953 |
| WO | 2005017385 A1 | 2/2005 |
| WO | 2005097590 A1 | 10/2005 |
| WO | 2019172754 A1 | 9/2019 |

\* cited by examiner

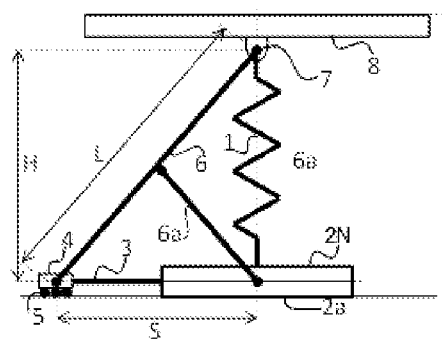
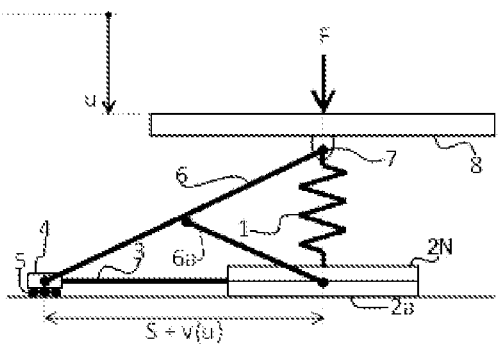
FIG. 4A  FIG. 4B
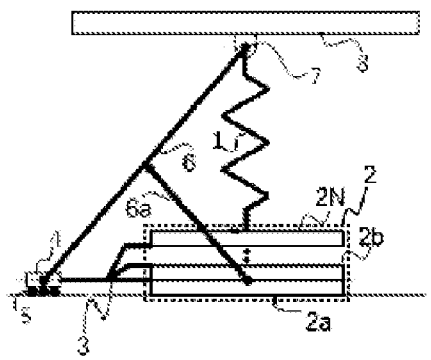
FIG. 5

SELF-CENTERING IMPACT ENERGY DISSIPATION MECHANISM

CROSS REFERENCE TO RELATED APPLICATION

This Application is a 371 of PCT/IB2019/058571 filed on Oct. 8, 2019, which is incorporated herein by reference.

FIELD OF THE INVENTION

The present invention relates to the industry of impact energy dissipators. The nature of the situations in which energy must be dissipated is very varied, thus any new dissipation mechanism must be studied to evaluate its actual applicability to the problem in which it is expected to be implemented. In particular, the present invention is proposed as a mechanism for dissipating the kinetic energy of objects that impact against a rigid surface or body. These objects could eventually be cars, trains, boats, etc. Each possible proposed application implies a different technological development; however, the proposed dissipation mechanism has the same basic components for the different possible applications.

STATE OF THE ART

Currently there are numerous ways to absorb mechanical energy associated with movement, which generally consider dissipation by inelastic deformation, friction or elastic storage of energy.

Whether on roads, railways or ports, there are devices specially designed to absorb kinetic energy from vehicles that eventually impact the limits of the route. Thus, in the case of roads, there are various forms of road guardrails arranged on the sides of the roads, or the vehicles have energy dissipation mechanisms against impacts that are incorporated into their chassis. For the case of ports, there are marine rubber fenders installed in the docks that protect both the latter and the ship, from the force that generates the impact. In the case of trains there are railway guardrail at the ends of tracks, in stations or maintenance facilities and the cars are assembled on bearings that cushion their movement. In addition, there is a wide range of damping devices with various applications that dissipate energy or attenuate the displacements of the devices to which they are connected, as an example it can be mentioned car dampers, washer dampers, devices to attenuate vibrations in rotary hammers, among many others. Each of the systems described has different dissipation mechanisms and their efficiency and effectiveness can be measured in terms of the amount of energy absorbed, amount of energy dissipated and rebound speed of the vehicle when losing contact with the fender, magnitude of the reaction force to the impact, maximum deformation of the interacting objects. Among the prior art documents, US20180178885A1 is cited, which describes a mooring mechanism which comprises a support capable of being assembled on a maritime vessel, a first fastening component connected to the support through an adjustment mechanism, and a second fastening component connected to the support. The operation of the adjustment mechanism moves the first fastening component relative to the second fastening component to allow a structure to be fastened therebetween to tie a sea boat to the structure.

Also in the technical field of ship mooring is U.S. Pat. No. 8,408,153B2, which describes a system capable of receiving and partially controlling the process of approaching a vessel to a berth place. The system is composed of multiple devices assembled along the berthing line and each device has at least one contact mechanism with the ship supported on a mobile system that must allow movement relative to the dock and capable of fitting to the ship's hull. A sensor detects the position of the ship relative to the dock and a processor may instruct the system to adjust the response of the mechanism during reception of the ship and reduce the approach speed of the ship to its berth place.

The two previous references represent the state of the art in material of ship mooring systems. In conjunction with the "Shore Tension" system, they are natural substitutes for the technology proposed by the device proposed in this patent if we think of it as a marine rubber fender. These patents are similar to each other and although the drive mechanisms may differ from each other, they do not represent large technological differences. The device proposed in our patent makes it possible to improve the ship's response both for berthing maneuvers and during the loading and unloading processes with the vessel moored. The device has proportionality in its dissipation capacity against the exciting load, has the ability to recover its original position autonomously (self-centering) and is independent of other energy sources, does not occupy space on the port platform and can be implemented as a new device or as an improvement to the current infrastructure, which substantially reduces the initial investment and increases the possibilities of updating old infrastructures.

Reference WO2005097590 corresponds to a mooring device that includes a suction driven attraction mechanism capable of engaging in a vessel to connect the vessel to a berth place. The suction mechanism may be moved relative to the mooring facility to be able to retract to a safety condition in which the marine rubber fenders prevent interaction of the vessel with the berthing infrastructure. We notice that it is sought to improve the behavior of a ship in berthing conditions thanks to its fastening mechanism by means of a suction panel, which adjusts to the position of the ship. Our device has several differences in relation to what is proposed here, firstly, it is functional for both mooring and berthing maneuvers, the dissipative mechanism is different and its capacity is not proportional to the load. In addition, the reference requires external energy for its operation which makes it dependent on energy support.

In a completely different field of application, invention U.S. Pat. No. 6,279,693B1, considers a friction damper adapted for railway vehicles including a housing having a sliding end surrounding an end of a movable shaft relative thereto. The opposite ends of the housing and the shaft may each have a connecting element for connection with independent moving elements. One or more friction elements of different materialities, which may be incorporated into the housing to interact with the shaft. The housing may be adapted to generally maintain pressure between the friction elements and the housing within a range of desirable pressures. This reference was incorporated as a sample of frictional dissipation device applied to railway wagons, which gives another development area to the technology to be patented. Our device has several advantages compared to the one proposed by this patent, especially regarding the proportionality of the dissipated energy, so it would be a significant technological improvement. In a similar development line, patent WO2005/017385 A1 is presented, in which it is showed a frictional damper for vehicles that has a dissipation capacity proportional to the applied load. This device differs from that proposed in this patent, in the form of the dissipation mechanisms, and the dissipation capabilities of the device.

On the other hand, application CL201502305 describes a compact frictional energy dissipation device, simple and capable of taking large loads avoiding the existence of a residual deformation to be used in a wide range of applications such as energy dissipation in various structures, comprising a body internally symmetrical around its vertical axis having an internal cavity formed by 2 or more bars or arms which at their ends form wedges and because inside said body a central stem is arranged two or more wedges a compression elastic element and where the compression elastic element is in at least one of its ends fixed to the arms at whose ends a friction surface is arranged. Despite the similar language and the similar names of the components of the application CL201502305 with respect to the present invention, the device differs significantly with the present technology, both in the geometric form of the dissipation mechanisms, as well as in the way of operating of the devices and the dissipation capabilities of the device.

Finally, we refer to document CN103303230A, which teaches a device for protection against collisions of a car, particularly to a frictional mechanism of absorption of energy generated by the collision of the car. The device comprises an energy absorbing box and a damping bar, in which the damping bar is fixedly assembled on a bumper of the vehicle and extends in a front direction and a rear direction; a frictional damping element is assembled on the energy absorbing box. This device has a car collision dissipation mechanism which, unlike the present proposal, does not have a self-centering mechanism and its dissipation capacity is fixed and depends on an adjustable external tightening system, but is not proportional to the magnitude of the load applied.

For all the above, there is a technological opportunity to develop an optimized mechanism in energy dissipation, so that the same is carried out in a much more controlled way. This has an important effect on the attenuation of the dynamic response of the object or vehicle that impacts with the mechanism, which is sought to achieve by decreasing the deformation or path of the fender during the impact, reduce the rebound speed, thus mitigating the damage in the vehicle and in the containment structure.

Solution to the Technical Problem

To solve the problem posed, a self-centering impact energy dissipation mechanism is presented, that is, it works in equal initial conditions against different loads since it has the ability to recover its original shape after load is removed, without the need for maintenance between events. On the other hand, the device is able to dissipate energy in a controlled manner in successive events, without significantly changing its properties. The two above requirements are met by two basic components in the device: an elastic element, and a friction dissipation element. The elastic element provides the "self-centering" force which is proportional to the deformation imposed by the impact load. The dissipation element comprises a frictional element in which the normal force generating the friction force is proportional to the force exerted by the elastic element. Due to the foregoing, said dissipation element imposes in the impact direction a non-conservative force that allows controlled dissipation of the impact energy.

In order to achieve that the elastic force allows the self-centering of the device, the friction force projected in the direction of the device deformation by impact load, must be less than the elastic force in said direction. This is achieved thanks to the geometric design of the device which ensures that the friction force is always less than the elastic force. Due to all of the above, the device can respond in proportion to the impact load applied on both its elastic component and frictional component, dissipating energy in proportion to the imposed displacement and load.

BRIEF DESCRIPTION OF THE DRAWINGS

The following figures are attached for further illustration of the proposed self-centering impact energy dissipation mechanism.

FIG. 4A shows a schematic view of a simplified or basic embodiment of the mechanism of the present invention in the rest position.

FIG. 4B shows a schematic view of a simplified or basic embodiment of the mechanism of the present invention in a compressed position when subjected to loading.

FIG. 5 shows a schematic view of an embodiment similar to that described in FIGS. 4A and 4B in which a greater number of friction elements or plates are incorporated in a stacked form and integrated into a friction dissipation member.

DESCRIPTION OF THE INVENTION

Figures 1A, 1B:
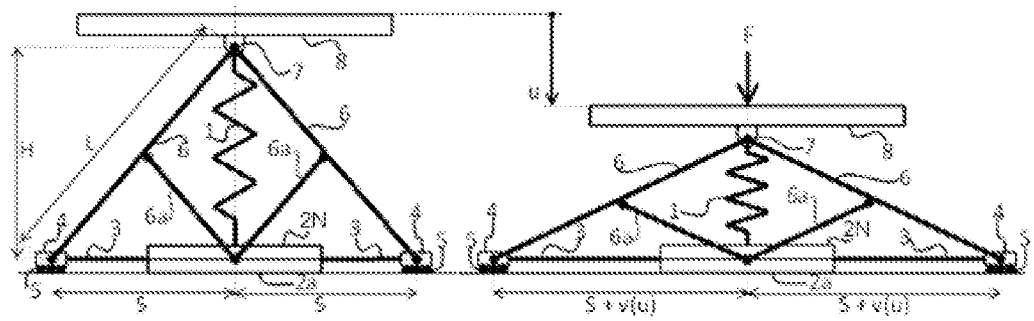
FIG. 1A shows a schematic view of an embodiment of the mechanism of the present invention in rest position.
FIG. 1B shows the mechanism of FIG. 1A in compressed position, under load.

Referring to FIGS. 1A and 1B, the present invention consists of a one-degree of freedom, self-centering device or mechanism dissipating energy transmitted by an impact load, for mounting on ground, foundation or in a structure, applicable as a road, port, railway or similar passive safety element for protection of the respective vehicles or structures against a collision, which has: a) an elastic element or spring (1) located in the center of the device and oriented in the direction of the degree of freedom presented with arrow u; b) a friction dissipation member formed by at least two rigid and vertically stacked pressure plates (2a, . . . , 2N), wherein the upper face of the pressure plate located in the above position supports and fastens the lower end of the elastic element (1), wherein all the pressure plates are mechanically locked together to restrict the relative displacement between them in the direction of their plane, but allowing the displacement perpendicular to said plane for mounting purposes; the pressure plate located in the bottom position, corresponding to the plate (2a) in FIG. 1, is fixed on its lower face to the structure to be protected; a pair of friction element systems composed of two or more friction elements (3) that slide within cavities or spaces defined between said at least two plates (2a) and (2N) are subjected to pressure transmitted by the elastic element (1), so that they can move in a direction orthogonal to the axis of the elastic element (1) and that when sliding in the presence of friction forces they provide energy dissipation to the device that constitutes the invention; c) two coupling elements (4) located on the left and right sides of the device, which are fastened to the friction elements (3); d) sliding supports (5) are attached to each of the coupling elements (4), allowing it to slide in a direction perpendicular to the longitudinal axis of the elastic element (1); e) at least one pair of rigid elements (6), for example bars, arranged diagonally on both sides of the elastic element (1), which are attached by means of articulated connections to the coupling elements (4) at their lower ends or close to the structure to be protected and that receive or pivotally connect at their midpoint an intermediate rigid element (6a) that, in turn, is labelledly attached at its end opposite to one of the pressure plates of the guiding member; f) a pin (7) that allows articulated attachment of the upper end of the elastic element (1) with the rigid elements (6); g) a panel (8) that receives the impact load, represented by the arrow F in FIG. 1B, which in a preferred embodiment is attached to the damping device by means of the pin (7), at the same point of attachment of the rigid elements (6) with the elastic element (1).

Figure 3A:
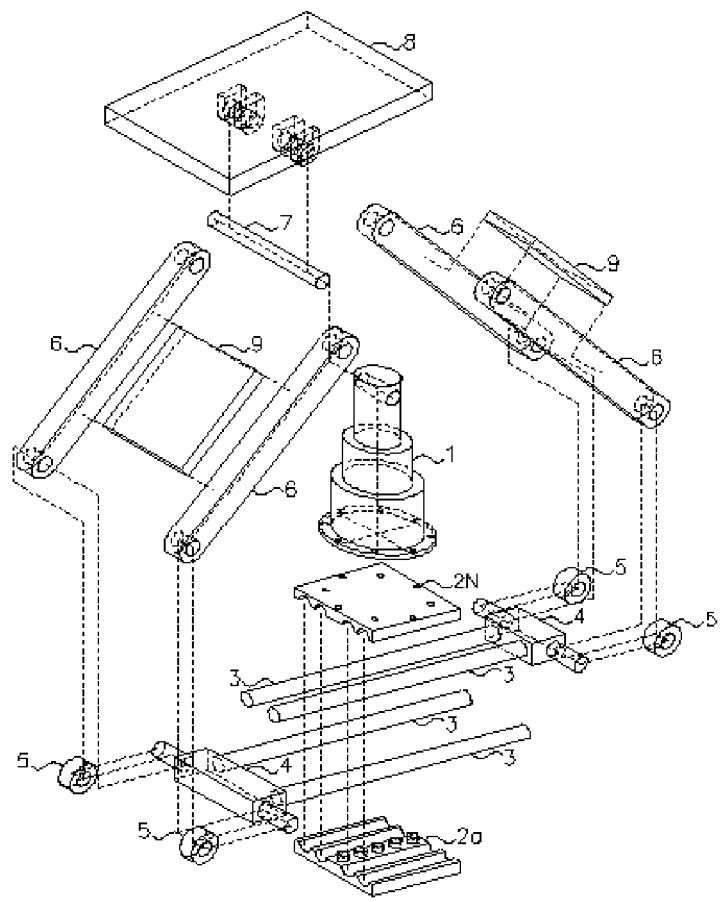
FIG. 3A shows an isometric or three-dimensional view of an embodiment of the impact damping device, with an exploded view of the set of components and suggested assembly form by segmented lines.
Figure 3B:
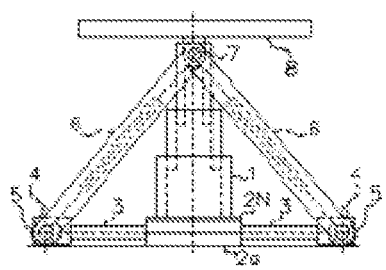
FIG. 3B shows a side view of the mechanism of FIG. 3A assembled, in its undeformed configuration.
Figure 3C:
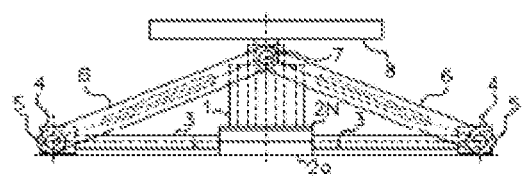
FIG. 3C shows a side view of the mechanism of FIG. 3A assembled, in its deformed configuration to its maximum capacity by compressive load.

In a particular embodiment, according to FIGS. 3A, 3B and 3C, the mechanism further includes a bracing or stiffening member (9) that attaches pairs of rigid elements (6) located on the same side of the elastic element (1), allowing said pairs of rigid elements to work together.

The incorporation of the intermediate rigid elements (6a) is a design suggestion that allows conditioning deformation of the device in an aligned manner with the central vertical axis, therefore restricting the device displacement in the direction perpendicular to the plane of the ground, foundation or in a structure against which it is fixed, represented by the lower line in the diagrams of FIGS. 1A and 1B. Optionally, as presented in FIG. 3A-3B the elastic element (1) may be designed to withstand lateral stresses.

A minimalist or basic embodiment of the device is depicted in FIG. 4. It presents a self-centering mechanism dissipating energy transmitted by an impact load, for assembly on a ground, foundation or structure, applicable as a road, port, railway or similar passive safety element for protection of the respective vehicles or structures against a collision, comprising: at least one rigid element (6) that is arranged as a side of a triangle whose basal side rests on said ground, foundation or structure, is assembled in an articulated manner, with its first end at the apex of said triangle, its midpoint pivoted to an intermediate element (6a), which can articulate in regard to a point on the basal side of the triangle, and with its second end pivoted with respect to at least one friction element (3); wherein said at least one friction element (3) has a longitudinally extended body and a free end which are arranged in the direction of the basal side of the triangle, covering a distance greater than the projection of the rigid element (6) on said basal side; a friction dissipation member (2), comprising some rigid and stackably assembled elements or pressure plates (2a, . . . , 2N), which have cavities defined between them to slidably and tightly receive said at least one friction element (3) in a portion of its longitudinal extension, wherein the pressure element (2a) is fixedly supported against the ground, foundation or structure; at least one elastic element (1) arranged with its axis in the direction of the degree of freedom of the mechanism and perpendicular to the basal side of the triangle, it is pivotally attached by its distal end at the apex of the triangle to a panel (8) arranged to receive the impact load and to said at least one rigid element (6), and its proximal end is fixedly supported against the pressure element (2N) to transmit a force that presses each friction element (3) between the pressure elements (2a, . . . , 2N); wherein said at least one friction element (3) and at least one rigid element (6) are joined by a coupling element (4) that connects them with at least one sliding support (5) that rests against the ground, foundation or structure allowing sliding of each friction element (3) in the direction perpendicular to the impact load when it compresses the elastic element (1) by modifying the triangular geometry of the mechanism and allowing friction dissipation of much of the energy imposed by the impact load.

In a particular embodiment of the mechanism, said at least one coupling element (4) fastens several friction elements (3), included in the same plane or in different planes.

In another particular embodiment of the mechanism, each friction element (3) has a cross section that provides multiple surfaces for friction.

In any of the above cases, the friction dissipation member (2) comprises pressure elements or plates (2a, . . . , 2N) with cavities oriented so as to receive multiple friction elements (3) that slide at different levels or planes with respect to the direction of the axis of the elastic element (1).

In another particular embodiment of the mechanism, the pressure elements or plates (2a, . . . , 2N) of the friction dissipation member (2) are mechanically locked together to restrict the relative displacement between them in the direction of their plane, but allowing the displacement perpendicular to said plane.

In another particular embodiment of the mechanism, the friction dissipation member (2) further comprises a watertight housing enclosing the pressure elements or plates (2a, . . . , 2N) within which only the friction elements (3) project, which connects on its upper face the elastic element (1) and is fixed on its lower face to the ground, foundation or structure, without the technology being seen inside it. Optionally, said housing of the friction dissipation member (2) includes a lubrication box, to incorporate lubricant between the elements or pressure plates (2a, ..., 2N). In another secondary alternative, the friction dissipation member (2) further comprises heat dissipation means comprising at least one of the following options: a radiator system operating by natural or forced convection, a heat exchanger, or employment of a material of higher thermal conductivity for the manufacture of the watertight housing. Thereby, additional means for promoting heat dissipation and controlling friction are provided.

In another particular embodiment of the mechanism, said at least one rigid element (6) with its corresponding intermediate element (6a) and said at least one friction element (3) with its corresponding coupling element (4) and sliding support (5) are defined as a primary set that is associated with a plane perpendicular to the ground, foundation or structure, and said primary assembly is replicated symmetrically with respect to the axis of the elastic element (1), so that the replicated set can simultaneously articulate to the primary assembly when the elastic element (1) is compressed.

In another particular embodiment of the mechanism, said at least one rigid element (6) with its corresponding intermediate element (6a) and said at least one friction element (3) with its corresponding coupling element (4) and sliding support (5), are defined as a primary set associated with a plane perpendicular to the ground, foundation or structure, and said primary set is replicated in at least one plane with a predetermined angular displacement with respect to the axis of the elastic element (1), so that each replicated set can simultaneously articulate to the primary assembly when the elastic element (1) is compressed, wherein the pressure elements or plates (2a, ..., 2N) have their cavities oriented so as to receive between each pair of pressure elements consecutive to the friction elements (3) of a single set either primary or replicated, so that the friction elements (3) slide at different levels or planes with respect to the direction of the axis of the elastic element (1) in parallel to the corresponding angular displacement.

In a particular embodiment, related to the case of replication with symmetry in a same plane, the mechanism comprises friction elements (3a, 3b), each attached to rigid elements (6) on opposite sides with respect to the axis of the elastic element (1), wherein an overlap is established between the friction elements (3a, 3b) that allows energy dissipation by friction between them. Optionally, said overlap between the friction elements (3a, 3b) occurs in several different planes.

In another particular embodiment of the mechanism, each pressure element (2a, ..., 2N) has a replaceable or sacrificial part, depending on its wear, or each pressure element (2a, ..., 2N) is a sacrificial component in its entirety.

With the arrangement described it is obtained that the impact load F produces the transition of the mechanism between a rest position represented in FIG. 1A to a compressed position shown in FIG. 1B. This allows transmission of load by the elastic element (1) to the plate (2N), which compresses the friction elements (3) against the fixed plate (2a), so that together the plates (2a, 2N) and the friction elements (3) form the frictional dissipator. Due to the geometry of the impact damping device constituting this invention, the impact load F generates a displacement u in the direction of the elastic element (1) which causes the friction elements (3) to be displaced in a transverse direction by an amount v(u). The latter displacement of the friction elements (3) occurs in the presence of compression load transmitted by the elastic element (1), which results in energy dissipation proportional to the magnitude of the impact load F and also proportional to the displacement u that said load produces in the damping device. Due to the above, the energy dissipated by the device is approximately proportional to the displacement u, imposed by the impact load. This makes implementation of the device under conditions of greater loads and deformations simply a matter of geometric scale.

The operation of a protective device against impact loads from this mechanism is based on the balance of its components in deformed condition, considering large displacements. This is, such as is shown in FIG. 1A and FIG. 1B, the displacement u is of the same order of magnitude as the height H of the device, which forces the balance to be set in the deformed configuration. Considering the balance of the diagonal bars of the damper separately, that is, each rigid element (6) of length=2+2, which do not undergo deformation, only rotation and translation, the following kinematic relationships are met:

$$(H-u)^2 + (S+v(u))^2 = L^2$$

$$v(u) = \sqrt{L^2 - (H-u)^2} - S$$

From the development of the equations of balance of forces and moments in deformed configuration, the constitutive relationship of the mechanism is obtained, which links the applied force with the displacement and the geometric and mechanical properties of the device.

$$F = K_0 u \left(1 + \left(\frac{4n\mu(H-u)}{\sqrt{L^2 - (H-u)^2}}\right) \text{sign}(\dot{u})\right) \quad \text{(Eq. 1)}$$

In the above equation, n corresponds to the number of surfaces of the friction elements (3) subjected to frictional force due to the pressure applied by the elastic element (1). In the configuration shown in FIGS. 1A and 1B, n=2, since the friction elements (3) are confined by the upper face against the plate (2N) and by the lower face against the plate (2a). However, it is possible to include more elements of the pressure plate type between which the friction elements (3) are arranged, obtaining greater friction force for the same load transmitted by the elastic element (1), thus increasing the energy dissipation capacity. However, an excess in the friction force may cause the damping device to be unable to recover its non-deformed configuration, which is undesirable.

Figure 2:
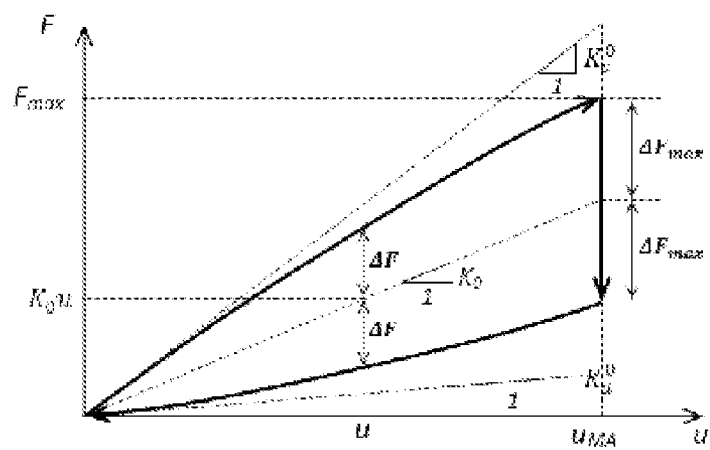
FIG. 2 shows the theoretical relationship between force and displacement (or deformation) of the mechanism of the present invention when subjected to loading and unloading.

Considering the force versus displacement ratio defined above, the hysterical cycle of the proposed impact protective device would be that depicted in FIG. 2, wherein it has to:

$$K_c^0 = K_0 \left(1 + \frac{4\mu n H}{\sqrt{L^2 - H^2}}\right)$$

$$K_d^0 = K_0 \left(1 - \frac{4\mu n H}{\sqrt{L^2 - H^2}}\right)$$

$$\Delta F(u) = \frac{4\mu n K_0 u(H-u)}{\sqrt{L^2 - (H-u)^2}}$$

$$\Delta F(u) = \frac{4\mu n K_0 u(H-u)}{\sqrt{L^2 - (H-u)^2}}$$

-continued $$\Delta F_{max} = \frac{4\mu n K_0 u_{MA}(H - u_{MA})}{\sqrt{L^2 - (H - u_{MA})^2}}$$

The slopes $K_c^0$ and $K_d^0$ correspond to the tangent rigidities in the non-deformed condition of the loading and unloading curve respectively. The slope of the load curve decreases with increase of the displacement u and, on the contrary, the slope of the discharge curve grows with increase of u. In order for the device to be self-centering, that is, to be able to recover its original shape at the end of the interaction with the impact load, it is necessary that $K_d^0>0$. On the other hand, for the dissipated energy to be greater, it is required that $\Delta F(u)$ to be greater, but always fulfilling the condition $K_d^0>0$. The device is capable of deforming considerably, however, its maximum crushing, $u=u_{MA}$, is limited by its geometry. Considering all the above, the design of the damping mechanism must take into account an adequate choice of parameters: L, H, $\mu$, $K_0$ and $u_{MA}$, complying with the stopping condition of the object of mass M impacting against the damper with speed $v_0$, at a distance less than or equal to the maximum permissible displacement of the fender, $u_{MA}$. The latter imposes a restriction on the maximum absorbed energy capacity (area under the load curve in FIG. 2) by the device when $u=u_{MA}$, which must be considered in the design. If the maximum crushing capacity of the damper device is reached, the impact load would be transmitted directly to the structure, since when $u=u_{MA}$, the damper mechanism behaves as a rigid element.

In a suitable design of the damper for impact loads, from the point of view of the load force capacity and the absorbed energy, the stiffness $K_c^0$ should tend to be maximum and the stiffness $K_d^0$ tend to zero. The latter occurs concurrently when the following constraint is satisfied:

$$H \leq \frac{L}{\sqrt{1 + 16n^2\mu^2}} = \alpha L, \; con \; \alpha = \frac{1}{\sqrt{1 + 16n^2\mu^2}}$$

Considering the above, the geometric parameters H and L are linked by means of the coefficient of friction p and the number of displacement planes with friction n, reducing the number of design variables. The maximum energy absorption capacity of the device must at least equal the energy imposed by the impact, $E_I$. This imposes a restriction for rigidity of the elastic element, $K_0$ (or $K_0(u)$), if rigidity varies with the imposed deformation, for the coefficient of friction, $\mu$, the number of friction surfaces, n, and a single geometric variable, L, which together define the height H.

$$E_I \leq \int_0^{u_{MA}} F(u, \dot{u}) = K_0 \int_0^{u_{MA}} u\left(1 + \left(\frac{4n\mu(H-u)}{\sqrt{L^2 - (H-u)^2}}\right)\right) du$$

As for spring stiffness, $K_0$, it must comply with restrictions necessary (although not sufficient) to achieve compatibility with the previous condition relating L and H by p and n. This has to do with the relationship between the maximum deflecting dissipative force $\Delta F_{max}$, and the maximum elastic force provided by the spring, $K_0\mu_{max}$, since the first must always be smaller than the second, which can be seen in FIG. 2. The latter imposes the following constraint:

$$(1+16n^2\mu^2)(H-u_{MA})^2 < L^2$$

Considering the maximization condition of the dissipated energy, we have to $H \approx \alpha L$, and since the maximum permissible displacement, $u_{MA}$, cannot exceed the height H of the damping device, it can be said that: $u_{MA}=\beta H \approx \alpha\beta L$, with $\beta<1$. Replacing the latter expression in the previous equation has to be fulfilled:

$$(1-\beta)^2 < 1$$

The above is trivially satisfied for any value of $\beta$, since by its definition this is always less than 1.

In summary, the most efficient mechanism from the point of view of energy dissipation is defined by the parameters H, $\mu$, n and $K_0$, with $L=H/\alpha$, con $1/\alpha=\sqrt{1+16n^2\mu^2}$. The parameter p may be considered as constant and equal to the kinematic coefficient of friction between the surfaces of the pressure plates (e.g.: 2a, 2N) and the friction elements (3), assuming a value close to $\beta=0.4$ when it comes to steel surfaces, for example. Once the materiality of the friction elements (3) and the pressure plates and the number of pressure plates—which conditions the value of n—, the device is defined by only two parameters that must be determined in accordance with the use or demand of the dissipation mechanism, these are H and $K_0$. Both parameters are related to the resistance and dissipation capacity of the device, however, only H is related to the permissible deformation capacity of the device, $u_{MA}$. Therefore, a design strategy is proposed in which H is determined so that the maximum design displacement, $u_{MD}$, does not exceed the maximum permissible displacement, $u_{MA}=\beta H$, that is:

$$H \geq \frac{1}{\beta} u_{MD} \qquad (Eq. \; 2)$$

Once the height H of the device has been defined according to the displacement demand obtained from analysis, the rigidity $K_0$ of the spring is the only parameter that defines the resistant capacity of the damper. Accordingly, said rigidity must be determined so that the demand for design maximum force or force, $F_{MD}$, does not exceed the maximum permissible force of the device under load, $F_{MA}$, calculated for a displacement $u=u_{MA}=\beta H$. The above results in the following design constraint:

$$F_{MA} = K_0 u_{MA}\left(1 + \frac{4n\mu(H - u_{MA})}{\sqrt{L^2 - (H - u_{MA})^2}}\right) = \qquad (Eq. \; 3)$$

$$K_0 \beta H\left(1 + \frac{4n\mu H(1 - \beta)}{\sqrt{L^2 - H^2(1 - \beta)^2}}\right) \geq F_{MD}$$

Then, the stiffness of the elastic element must comply with:

$$K_0 \geq \frac{\sqrt{L^2 - H^2(1 - \beta)^2}}{\beta H\left(\sqrt{L^2 - H^2(1 - \beta)^2} + 4n\mu H(1 - \beta)\right)} F_{MD}$$

Known the value of n, $\mu$ and $\beta$, equations 2 and 3 allow to design the mechanism to satisfy demands of displacement and load.

Device design methodology, based on time-history analysis:
1) Arbitrarily choose parameters H, n, $\mu$, $K_0$ and $\beta$.
2) Run analysis to determine the displacement and load demands, $u_{MD}$ and $F_{MD}$.
3) Use equations 2 and 3 to correct parameters H and $K_0$, leaving n, $\mu$ and $\beta$ fixed.

4) Repeat steps 2) and 3) until the demands—$u_{MD}$ and $F_{MD}$—do not change from the previous calculation.

APPLICATION EXAMPLES

The proposed mechanism is considered to have numerous areas of application, the most obvious being:
Marine Fenders.
Road and railway guardrails.
Damage control of mining equipment.
Seismic damping of buildings.
Impact absorbers with generic uses as in vibratory equipment.

Of all the possible areas of application, it is considered that the areas of marine fenders and guardrails are those that would have the greatest impact. The first is due to the potential benefit of the proposed device in better controlling the energy dissipation mechanism, which is an important comparative advantage over traditional products.

Example 1

By way of example, the concrete model that was experimentally tested is presented below.

Figure 6:
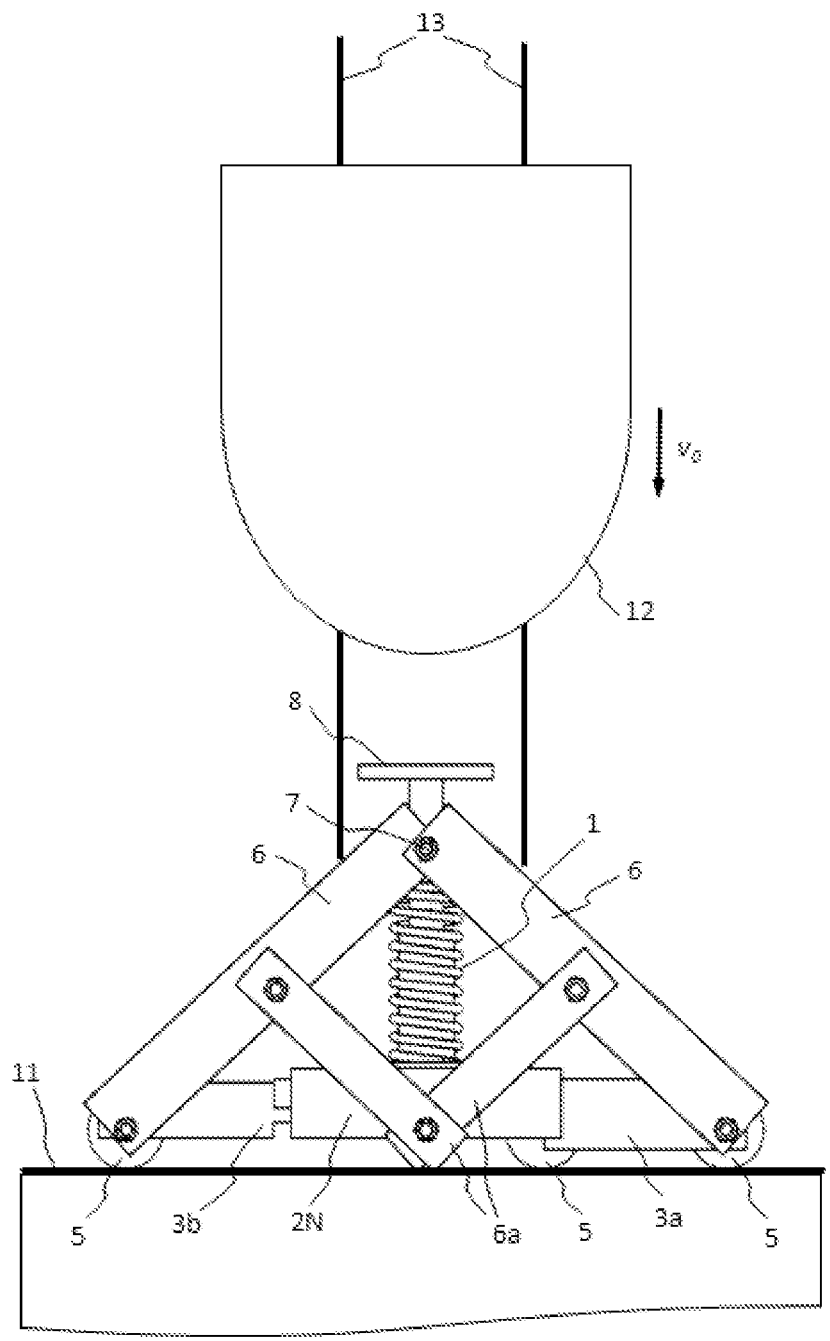
FIG. 6 shows a schematic top (or plan) view of a model of the mechanism of the present invention, used in laboratory tests, to which a mobile in the direction of collision aligned to the degree of freedom of the mechanism is approaching.
Figure 7:
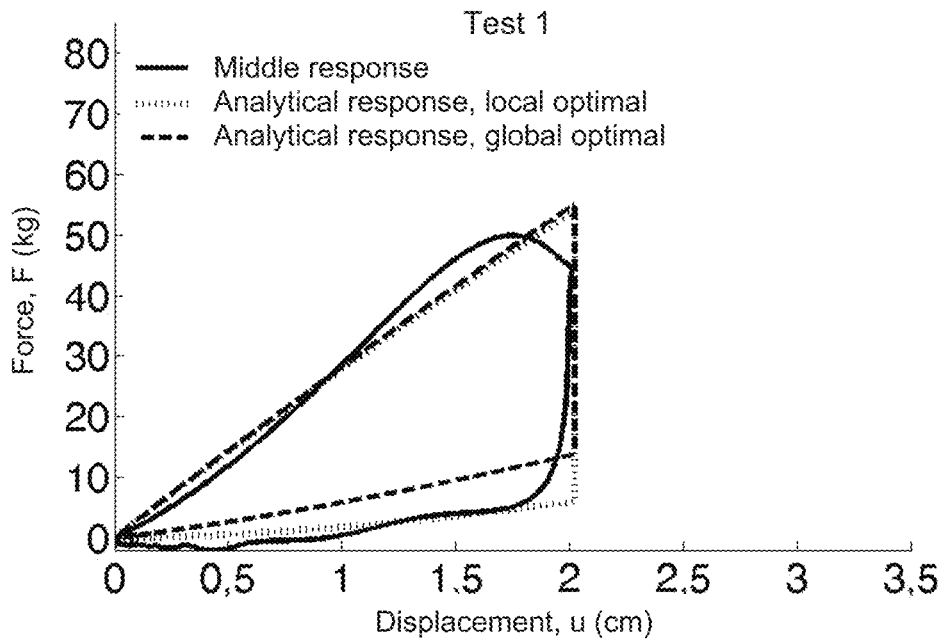
FIG. 7 shows the hysteresis cycles during the car-damper interaction obtained from the experimental results of a first test out of six laboratory tests with different mass and speed of the mobile impacting the damper.
Figure 8:
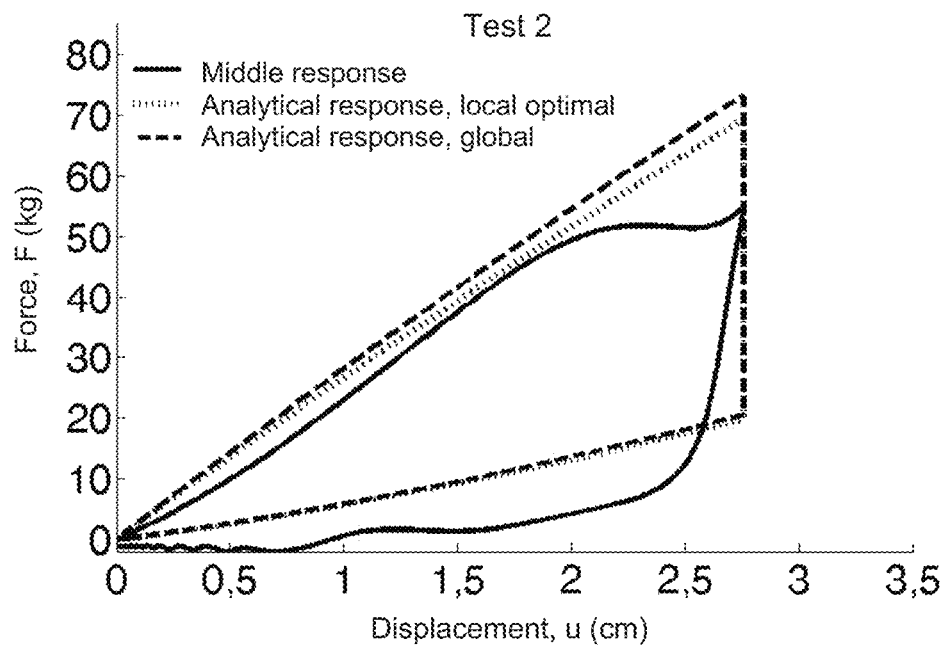
FIG. 8 shows the hysteresis cycles during the car-damper interaction obtained from the experimental results of a second test out of six laboratory tests with different mass and speed of the mobile impacting the damper.
Figure 9:
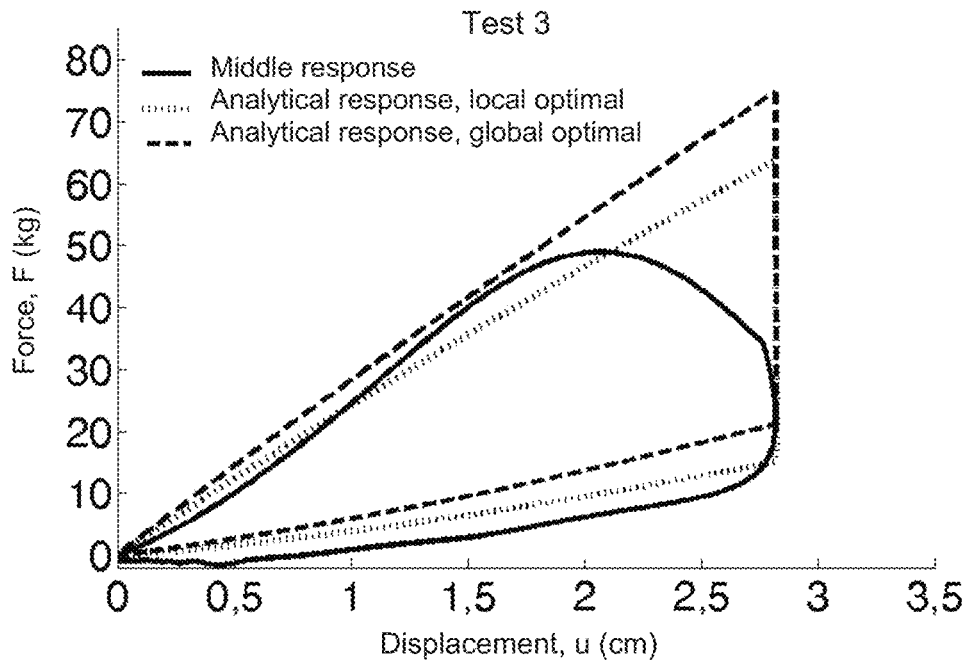
FIG. 9 shows the hysteresis cycles during the car-damper interaction obtained from the experimental results of a third test out of six laboratory tests with different mass and speed of the mobile impacting the damper.
Figure 10:
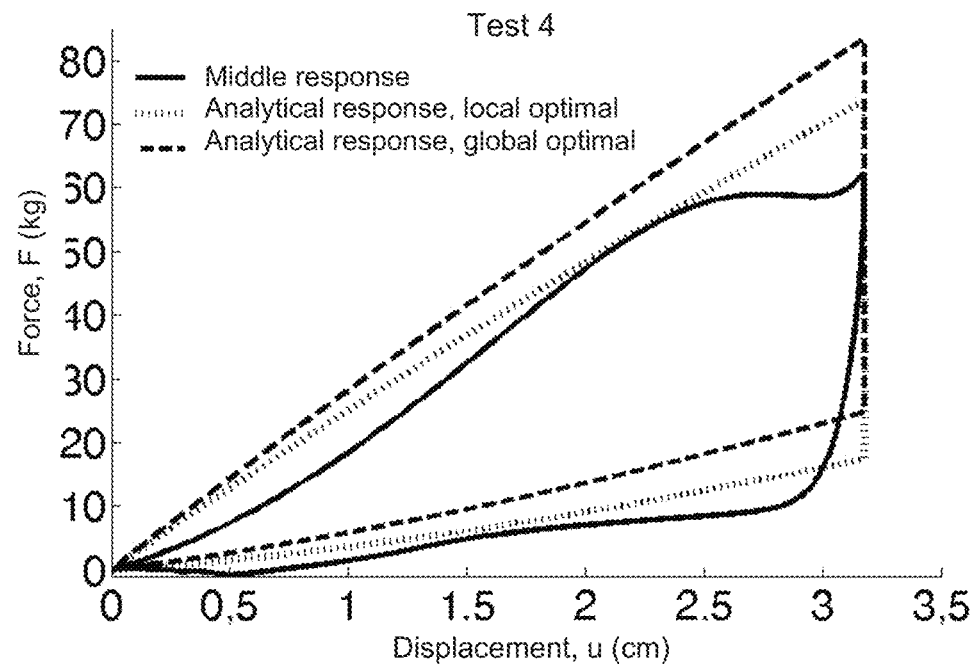
FIG. 10 shows the hysteresis cycles during the car-damper interaction obtained from the experimental results of a fourth test out of six laboratory tests with different mass and speed of the mobile impacting the damper.
Figure 11:
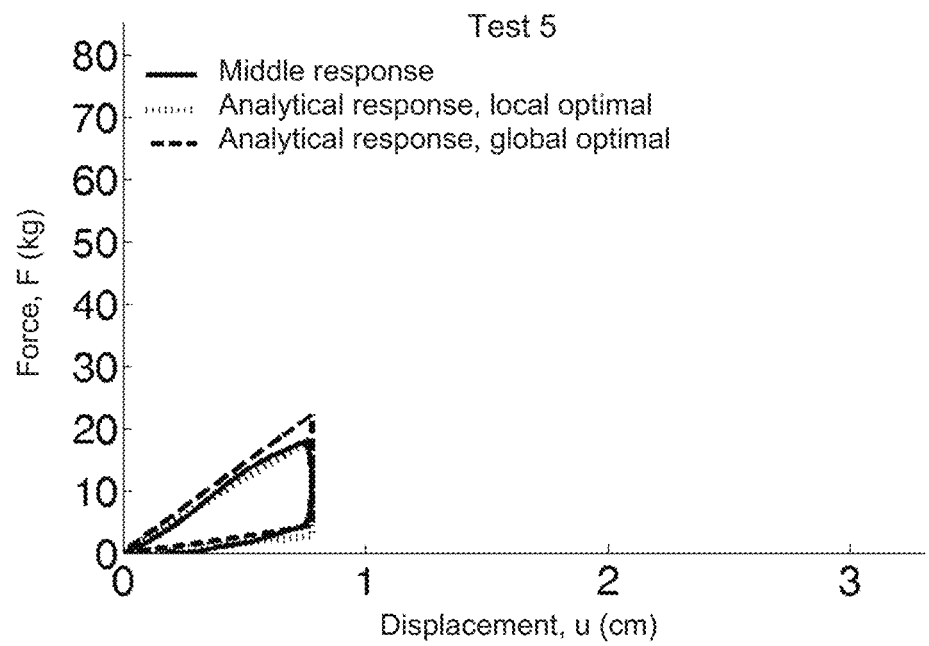
FIG. 11 shows the hysteresis cycles during the car-damper interaction obtained from the experimental results of a fifth test out of six laboratory tests with different mass and speed of the mobile impacting the damper.
Figure 12:
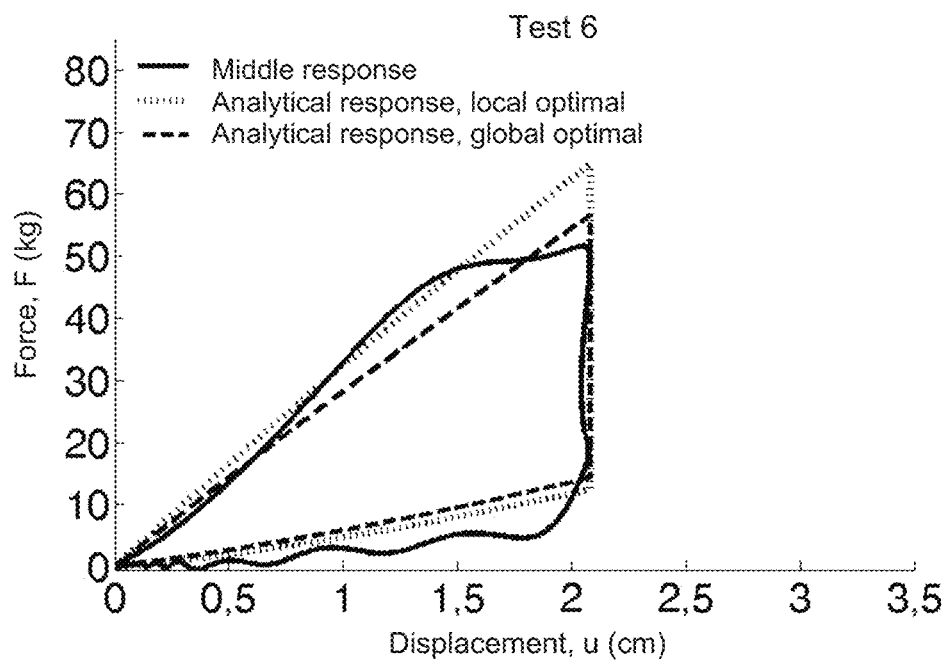
FIG. 12 shows the hysteresis cycles during the car-damper interaction obtained from the experimental results of a sixth test out of six laboratory tests with different mass and speed of the mobile impacting the damper.

In constructing the scale model according to FIG. 6 steel profiles, bolts, flat washers, nuts and bearing pulleys were used in the mobile supports. The basic characteristics and components of this mechanism are: its elements are very rigid, articulated attachments, it has an elastic element, in its base it has frictional elements. The device is able to adapt to large displacements imposed returning to its original shape thanks to the elastic element inside. A helical spring is used to materialize the elastic element (1) of the conceptual model, it is a piece that can be buckled when subjected to high compression loads. To eliminate any possibility of this occurring in the specific model, a buckling limiting element composed of two parts that operate as a stem and sleeve was included. For this particular model the top is inserted at the bottom as the imposed displacement increases. The upper part is also welded to the panel (8) which receives the impact of a rolled carriage (12). The lower part, which does not move when the mechanism is deformed, is welded to a pressure element (2a) which rests against the friction elements (3a, 3b) which are the moving parts of the frictional dissipator. The pressure element (2a) restricts the axial displacement of the buckling limiting element, but without resisting transversely to the axis of the elastic element (1). The latter because the surface of the pressure element (2a) against the friction element (3a) is greased to minimize friction between said parts, allowing the friction to develop only between the friction elements (3a) and (3b) in contact with each other, with only n=1 surface subjected to friction existing in the concrete model. Finally, a pair of short diagonals (6a) with pivotal attachments at their ends are included to condition the deformation symmetry of the damping mechanism. This was achieved in the experimental tests by restricting the displacement of the articulated connection point between the diagonals (6a), linking it to the support structure (11).

We now refer to the concrete assembly of the experimental protocol defined to simulate berthing of a ship, presented by the car (12), against the marine fender represented by the model of impact energy dissipation mechanism built. The berthing dock is assumed to be very rigid compared to the damping mechanism, so that the latter was anchored to a massive block of reinforced concrete, which constitutes the support structure (11), considered immovable for the purposes of the tests carried out.

The damping mechanism was installed on a wooden plank with rails to guide the displacement of its sliding supports (5) in horizontal direction, transversely to the impact direction. Between the wooden plank and the reinforced concrete block a pair of load cells arranged in parallel was installed, on each side of the damper, with a pre-stretch spring that subjected them to compression, to ensure that the measurements were within the reliable operating range of the cells. In addition, measures were taken to prevent misalignment of the car (12) during impact and to maintain the panel (8) that receives impact at the desired height.

To simulate boats of different sizes, the cart (12) was loaded with concrete blocks. These blocks were rigidly fastened to the car to prevent them from slipping or moving during impact.

To simulate berthing of the ship, with controlled speed of the car with concrete blocks, it was dropped by an inclined plane guided by rails (13) from heights between 10 to 23 cm (3.9 in to 9 in), thus giving different impact speeds to the car. Before the impact, the car passes from the inclined plane to a horizontal portion also guided by rails (13) that direct impact aligning it with the degree of freedom of the damping mechanism.

LVDT displacement sensors were installed to measure position of the carriage approaching the damping mechanism and crushing of the latter during the interaction.

Parametric experimental tests were carried out considering as variables mass of car, coefficient of friction of the damper and impact speed of the car. Three car masses were considered: 47 kg, 87 kg and 127 kg (103.6 lbs, 191.8 lbs and 279.9 lbs). The coefficient of friction was modified in the tests by adding sheets of different roughnesses in the frictional displacement zone. In total, 7 cases with different friction coefficients were considered, corresponding to steel versus greased steel, Teflon versus Teflon, steel versus sandpaper, polished steel versus polished steel, steel versus Teflon, 10 grit sandpaper versus 100 grit sandpaper and 180 grit sandpaper vs 180 grit sandpaper. The speed of the carriage was considered indirectly by dropping it down the inclined plane from heights of 10, 12, 13, 15, 20 and 23 cm (3.9 in, 4.7 in, 5.1 in, 5.9 in, 7.8 in and 9 in).

In total, in a first stage 85 tests were carried out with different combinations of the variables, which allowed identifying the materiality of the friction surfaces that led to the best results. In these tests it could be observed that as the friction on the contact surface of the friction elements (3) increases, the device loses the ability to self-center. This made it possible to determine that the most suitable contact surface of friction elements (3) are steel versus greased steel, polished steel versus polished steel and Teflon versus Teflon. Additionally, with the execution of this first experimental stage, deficiencies were identified in the assembly system that were improved in a second stage. 6 additional tests were performed (Table 1), with a single combination of sliding surfaces with friction (polished steel versus polished steel), 3 car masses (162.4 kg, 204.9 kg and 246.5 kg (358 lbs, 451.7 lbs, 543.4 lbs)) and its fall heights of 8, 11, 12, 13 and 14 cm (3.14 in, 4.3 in, 4.7 in, 5.1 in, 5.5 in).

TABLE 1

Parameters of execution of tests in second experimental stage.

| Test | Mass (kg) | Drop Height (cm) | Impact speed (m/s) |
|---|---|---|---|
| No1 | 162.41 | 12 | 0.2885 |
| No2 | 162.41 | 13 | 0.3568 |

TABLE 1-continued

Parameters of execution of tests in second experimental stage.

| Test | Mass (kg) | Drop Height (cm) | Impact speed (m/s) |
|---|---|---|---|
| No3 | 204.96 | 12 | 0.2756 |
| No4 | 204.96 | 14 | 0.3215 |
| No5 | 246.52 | 8 | 0.0745 |
| No6 | 246.52 | 11 | 0.2297 |

The data obtained in the experimental tests were exported to a software for processing, filtering, selection and construction of graphs.

In the graphs of FIG. 7 to FIG. 12 each graph is associated with a drop height (related to the impact speed). Tests 1 and 2, 3, 4 and 5, 6 correspond to the same mass of the car (12), with different fall heights. Cases 5 and 6, despite having the greatest mass, generated the least crushing in the damper, because the fall heights were lower than those of the other tests. Therefore, the impact speed and the kinetic energy imposed on the damper turned out to be lower, which is consistent with the lower force, crushing and therefore energy dissipated by the device in those tests.

Since the actual coefficient of friction of the surfaces of the friction dissipation elements in the concrete model tested is unknown, it was not possible a priori to estimate the response using the theoretical model presented above. To determine the coefficient of friction and the effective stiffness of the elastic element (1) inside the tested damper, a parametric analysis was performed around $K_0$ and $\mu$ using the theoretical equation reproducing the deformation history imposed in each experimental test. The results were contrasted with the experimental measurements of force and energy dissipated in the charge-discharge cycle in order to determine the value of $K_0$ and $\mu$ leading to the lowest error between experimental and analytical results in each test. This made it possible to determine the minimum and maximum values of said damper design parameters. Subsequently, a new parametric analysis was performed considering a matrix of values of $K_0$ and $\mu$ within the minimum and maximum limits determined above. The latter in order to determine the optimal values of said parameters that lead to the minimum error between experimental and analytical results in the complete set of the 6 tests carried out. The results of this parametric analysis are shown in Table 2.

TABLE 2

End and optimal values of the $K_0$ and $\mu$ parameters

| Parameter | Minimum Value | Maximum Value | Optimal |
|---|---|---|---|
| K (N/cm) | 132.35 | 170.40 | 167.09 |
| $\mu$ | 0.340 | 0.460 | 0.344 |

The load versus deformation graphs of the tested damper shown in FIG. 7 to FIG. 12 show three curves for each test. One of them, the most irregular, corresponds to the response measured experimentally. The other two curves correspond to the analytical prediction calculated using the parameters $K_0$ and $\mu$ optimized for the particular test and for the set of tests together, respectively.

By way of conclusion, the behavior analysis of the energy dissipator for impact loads, obtained results graphically very similar to those proposed in the mathematical model presented above. This can be seen in the behavior of the hysteresis cycle for all cases seen experimentally where both the maximum force and the dissipated energy (corresponding to the area enclosed in the curve) are similar between the experimental results and the theoretical predictions.

With the dissipated energy calculated it was possible to deduce that the model could be a "good marine fender" because experimentally it was able to dissipate almost entirely the energy imposed by an impact load, which corresponds to the kinetic energy of the car (12). This was evidenced by recording the rebound speed of the latter, which in almost all cases turned out to be of an order of magnitude lower than the impact speed.

The invention claimed is:

1. A self-centering mechanism for dissipating energy transmitted through an impact load, for mounting on ground, foundation or in a structure, applicable as a road, port, railway or passive safety element for protection of the respective vehicles or structures against a collision comprising:
    at least one rigid element arranged as a side of a triangle whose base side rests on said ground, foundation or structure, and is articulatedly assembled, with a first end at the apex of said triangle, a midpoint pivoted to an intermediate element, which is articulated in regard to a point on the base side of the triangle, and with a second end pivoted in regard to at least one friction element;
    wherein said at least one friction element has a longitudinally extended body and a free end which are arranged in a direction of the base side of the triangle, covering a distance greater than projection of the rigid element on said base side;
    a friction dissipation member, comprising rigid and stackably assembled elements or pressure plates having cavities defined therebetween for slidably receiving and fitting to said at least one friction element in a portion of its longitudinal extension, wherein a pressure element is fixedly supported against the ground, foundation or structure;
    at least one elastic element arranged with its axis in the direction of the degree of freedom of the mechanism and perpendicular to the base side of the triangle, is pivotally attached by a distal end at the apex of the triangle to a panel arranged to receive the impact load and to said at least one rigid element, and its proximal end is fixedly supported against the pressure element to transmit a pressure force to each friction element between the pressure elements;
    wherein said at least one friction element and at least one rigid element are attached by a coupling element that connects them with at least one sliding support that rests against the ground, foundation or structure allowing sliding of each friction element in the direction perpendicular to the impact load when it compresses the elastic element modifying the triangular geometry of the mechanism and allowing friction dissipation of the energy imposed by the impact load.

2. The mechanism according to claim 1, wherein said at least one coupling element fastens one or more friction elements.

3. The mechanism according to claim 1, wherein each friction element has a cross section that provides multiple surfaces for friction.

4. The mechanism according to claim 1, wherein the friction dissipation member comprises pressure elements or plates with cavities oriented so as to receive multiple friction elements that slide at different levels or planes with respect to the direction of the axis of the elastic element.

5. The mechanism according to claim 1, wherein the pressure elements or plates of the friction dissipation member are mechanically locked together to restrict the relative displacement between them in the direction of their plane, but allowing the displacement perpendicular to said plane.

6. The mechanism according to claim 1, wherein the friction dissipation member further comprises a watertight housing that encloses the pressure elements or plates inside which only the friction elements project, which connects the elastic element on its upper face and is fixed on its lower face to the ground, foundation or structure.

7. The mechanism according to claim 6, wherein said watertight housing of the friction dissipation member includes a lubrication box, for incorporating lubricant between the elements or pressure plates.

8. The mechanism according to claim 6, wherein the friction dissipation member dissipates heat by natural or forced convection, as a heat exchanger, or by being made of a material of higher thermal conductivity.

9. The mechanism according to claim 1, wherein said at least one rigid element with its corresponding intermediate element and said at least one friction element with its corresponding coupling element and sliding support are defined as a primary set that is associated with a plane perpendicular to the ground, foundation or structure, and said primary assembly is replicated symmetrically with respect to the axis of the elastic element, so that the replicated set can simultaneously articulate to the primary assembly when the elastic element is compressed.

10. The mechanism according to claim 9, further comprising friction elements, each attached to rigid elements on opposite sides with respect to the axis of the elastic element, wherein an overlap is established between the friction elements that allows dissipation of energy by friction between them.

11. The mechanism according to claim 10, wherein said overlap between the friction elements occurs in several different planes.

12. The mechanism according to claim 1, wherein said at least one rigid element with its corresponding intermediate element and said friction element with its corresponding coupling element and sliding support, are defined as a primary set associated with a plane perpendicular to the ground, foundation or structure, and said primary set is replicated in at least one plane with a predetermined angular displacement with respect to the axis of the elastic element, so that each replicated set can simultaneously articulate to the primary assembly when the elastic element is compressed, wherein the pressure elements or plates have their cavities oriented so as to receive between each pair of pressure elements consecutive to the friction elements of a single set either primary or replicated, so that the friction elements slide at different levels or planes with respect to the direction of the axis of the elastic element in parallel to the corresponding angular displacement.

13. The mechanism according to claim 1, wherein each pressure element has a replaceable or sacrificial part, depending on its wear, or each pressure element is a sacrificial component in its entirety.

* * * * *